United States Patent
Kempter et al.

(10) Patent No.: US 6,933,000 B2
(45) Date of Patent: Aug. 23, 2005

(54) PROCESSED MOZZARELLA CHEESE AND METHOD FOR ITS PRODUCTION

(75) Inventors: Klaus Kempter, Freising (DE); Alan Wolfschoon-Pombo, Freising (DE)

(73) Assignee: Kraft Foods R&D Inc., Munich (DE)

( * ) Notice: Subject to any disclaimer, the term of this patent is extended or adjusted under 35 U.S.C. 154(b) by 331 days.

(21) Appl. No.: 10/134,020

(22) Filed: Apr. 26, 2002

(65) Prior Publication Data

US 2002/0187237 A1 Dec. 12, 2002

(30) Foreign Application Priority Data

May 2, 2001 (EP) .............................. 01110105

(51) Int. Cl.⁷ .............................. A23C 19/00
(52) U.S. Cl. .................. 426/582; 426/518; 426/520; 426/573; 426/575; 426/578; 426/580
(58) Field of Search .................. 426/36, 392, 410, 426/414, 518, 520, 573, 575, 576, 577, 578, 580, 582

(56) References Cited

U.S. PATENT DOCUMENTS

| | | | |
|---|---|---|---|
| 4,143,175 A | 3/1979 | Whelan et al. | |
| 4,397,926 A | 8/1983 | Galal et al. | |
| 5,009,867 A | 4/1991 | Kratochvil | |
| 5,063,073 A | 11/1991 | Kratochvil | |
| 5,079,024 A | 1/1992 | Crane | |
| 5,225,220 A | 7/1993 | Gamay | |
| 5,395,630 A | 3/1995 | Gamay | |
| 5,549,916 A | 8/1996 | Gamay | |
| 5,567,464 A | 10/1996 | Barz et al. | |
| 5,895,671 A | 4/1999 | Adamany et al. | |
| 5,902,625 A | 5/1999 | Barz et al. | |
| 5,925,398 A | 7/1999 | Rizvi et al. | |

OTHER PUBLICATIONS

Kosikowski, F., Cheese and fermented milk foods, Second Edition, 1977, pp. 382–406, Printed in USA and distributed by Edwards Brothers, Inc., Ann Arbor, MI.*

European Search Report for European Patent Application No. 01 110 105.2, mailed Oct. 30, 2001.

* cited by examiner

Primary Examiner—Leslie Wong
(74) Attorney, Agent, or Firm—Fitch, Even, Tabin & Flannery

(57) ABSTRACT

The present invention relates to method of making processed cheese, especially mozzarella type cheese, comprising the steps of A) preparing a blend comprising young low-sodium-chloride cheese, hydrocolloids, and emulsifying salts, B) cooking the blend as obtained in step A to create a fibrous structure, and C) holding the fibrous structure as obtained in step B at an elevated temperature, wherein sodium chloride is added immediately before or during step C. According to another aspect, the instant invention relates to processed cheese obtainable by the above method, especially individually-wrapped cheese in slices.

17 Claims, No Drawings

PROCESSED MOZZARELLA CHEESE AND METHOD FOR ITS PRODUCTION

FIELD OF THE INVENTION

The present invention relates to processed cheese, especially mozzarella type cheese, to a method for the manufacturing the same, and also to processed cheese in slices manufactured from the above processed cheese by means of a hot filling technique. According to a second aspect, the present invention pertains to a cheese composition comprising a blend of young low-sodium-chloride cheese, hydrocolloids and emulsifying salts. According to another aspect, the present invention concerns the use of Cagliata cheese for the manufacturing of processed mozzarella type cheese.

BACKGROUND PRIOR ART

Mozzarella cheese is a very popular cheese, in particular for pizza and salad making. Natural mozzarella cheese has a number of unique qualities which are summarized and a scientific explanation of which is given in McMahon et al., Dairy Industries International, (1999), Vol. 64, No. 7, pp. 23–26. To give an example, mozzarella cheese has unique melt characteristics and stretchability due to its oriented fibrous structure. The above features are especially important for cheese that is used in pizza production. Hence, with recent increasing popularity of pizza, the consumption of mozzarella cheese has also increased significantly.

However, natural mozzarella cheese requires an aging time of several weeks to develop the desirable melt characteristics, and has a limited shelf life. Moreover, changes in the microstructure of natural mozzarella cheese, even upon refrigerated storage, have been reported. Therefore, efforts have been made to find a cheese having the taste, the melt characteristics and the stretchability of natural mozzarella, but which need shorter production times and has a longer shelf life.

U.S. Pat. No. 5,925,398 describes a method for the production of processed mozzarella cheese that has a longer shelf life so that it can be transported without refrigeration. In this method, which does not necessitate a time and energy consuming aging step, fresh mozzarella cheese is used as the starting material, and emulsifiers are added in an amount of from 0.01 to 2.0% by weight to give a curd which is then stretched and cooked in an extruder set at a temperature of from 80 to 120° C. This process is said to afford a cheese having a functionality that is similar to aged natural mozzarella cheese.

However, processed mozzarella cheese of this kind can not be subjected to the hot filling technique in individually wrapped slices, because it looses significant amounts of water during the cooking step in the extruder and because it is too viscous for the hot filling.

Hence, processed mozzarella cheese that can be stretched like natural mozzarella, especially when heated, and which has a long shelf life while requiring only short production times, is still highly demanded. Moreover, there is a strong demand for a processed cheese of the mozzarella type having the above features that can be used in the hot filling technique to afford individually wrapped slices.

DISCLOSURE OF THE INVENTION

It is therefore an object of the present invention to provide processed cheese, especially mozzarella type cheese that has stretching properties like natural mozzarella, a long shelf life, a taste like natural mozzarella and that can be processed into individually wrapped slices by means of the hot filling technology.

According to the present invention, this object is solved by a method for making processed cheese, especially mozzarella type cheese, comprising the following steps:
- A) Preparing a blend comprising young low-sodium-chloride cheese, hydrocolloids and emulsifying salts,
- B) Cooking the blend to create a fibrous structure, and
- C) Holding the fibrous structure obtained in step B at an elevated temperature, wherein sodium chloride is added immediately before or during step C.

The term "young low-sodium-chloride cheese" as used herein means cheese having experienced a ripening time of not more than 17 days and having a sodium chloride content of not more than 0.6 wt %, preferably not more than 0.4 wt %. There are no particular restrictions with respect to the young low-sodium-chloride cheese for use in the method according to the present invention. Mixtures of different kinds of low-sodium-chloride cheese may also be used. Preferably, pasta filata type cheese is employed. In a more preferred embodiment of the method according to the invention, mozzarella or Cagliata cheese or a mixture thereof is used.

The hydrocolloids which are added to the blend in step A may be selected from xanthan gum, locust bean gum, carragheen, guar gum or carboxymethylcellulose or mixtures thereof. Preferably xanthan gum and/or locust bean gum is used. Even though there is no particular limitation, the hydrocolloids are preferably used in an amount of 0.1 to 0.3 wt %, more preferably 0.2 wt % based on the blend of step A.

By adding the hydrocolloids, liquid losses during the cooking step B are avoided. The addition of the hydrocolloids moreover allows a hot filling to give individually wrapped slices.

The emulsifying salts can basically be added to the blend in any form such as dry powders and solutions, but they are preferably added as an aqueous solution. Preferred amounts for the emulsifying salts are from 0.5 to 1.5 wt % of the blend of step A, more preferably from 0.8 to 1.2 wt %.

Basically any emulsifying salt known in the field of processed cheese manufacturing may be used. Citrates and phosphates are preferred Especially preferred in terms of the stretchability of the obtained processed cheese are citrates, such as tri-sodium citrate.

The apparatus used for preparing the blend in step A is not particularly limited and any type of blender, such as ribbon blenders (horizontal spiral stirrers) may be used. However, to avoid transportation, the blending is preferably conducted in the same cooker in which the cooking step B is carried out. Even though not particularly limited with respect to the temperature, the blending in step A is preferably carried out at room temperature from the viewpoint of energy saving.

For preparing the blend in step A, the individual ingredients may be added in any order and without temporal restrictions. In a preferred embodiment of the method according to the present invention, the young low-sodium-chloride cheese and the hydrocolloids are admixed to form a first blend (step $A_1$) before the emulsifying salts are added to form a second blend (step $A_2$).

Cooking step B is preferably conducted not later than 0.5 hours, more preferably immediately after the formation of the blend in step A or step $A_2$, respectively. This also means that the emulsifying salts are preferably added to the initial blend not more than 0.5 h, more preferably immediately before cooking step B. In this way, a product having an even further improved stretchability can be obtained.

During the cooking step B, a fibrous protein structure is created. In order to maintain this structure, the cooking should preferably be carried out in a low-shear batch cooker. Generally, the processed cheese, once it has developed a fibrous structure, is desirably handled under low shear conditions. The term "low shear conditions" as used herein means conditions that have no or only a negligible adverse effect on the fibrous cheese structure, i.e. conditions that avoid a partial destruction of the structure.

Accordingly, continuous cookers and batch cookers with agitator blades, if used at all, must be used with great care in order to avoid damaging the fibrous structure. Preferred cookers are those having one or more spiral stirrers, which are known in industry as laydown cookers. In a particularly preferred embodiment, a batch cooker having two spiral stirrers, which are most preferably operating in opposite directions, is used. The rotating of the spiral stirrers speed should, of course, be selected so as to avoid damage to the fibrous structure. Dependent on the particular type of stirrer, a typical rotating speed should be not more than 200 rpm. Preferably, the rotating speed is about 70 rpm.

The cooking temperature is not particularly limited but preferably it is between 65° C. and 85° C. and more preferably about 70° C. to 75° C. The heating of the cooker is preferably carried out by direct steam injection. Typical cooking times are in the range of from 5 to 25 minutes, preferably about 15 minutes.

In step C, the fibrous structure as obtained in step B, is held at an elevated temperature to stabilize and develop further the formed fibre network. The structure may also be kneaded during step C. The kneading has to be conducted under low shear conditions in order to retain the formed fibrous structure as outlined above. Therefore, the requirements with respect to the apparatuses for the holding step are comparable to those for the cooking step.

Preferred parameters of the holding step C are as follows: holding time from 2 to 10 minutes, more preferably about 5 minutes, and a holding temperature in the range of from 65° C. to 85° C., more preferably about 75° C.

The holding step can be conducted in the same or in a separate device as long as this allows temperature control and kneading under low-shear conditions.

From an economic point of view, however, the holding step may desirably be carried out in the same batch cooker as step B. It is particularly preferable to use the same batch cooker having two spiral stirrers which is also used in cooking step B. However, the two spiral stirrers in step C are preferably rotating in the same direction. Similarly to the conditions in cooking step B, the preferred rotation speed of the stirrers for holding step C is not more than 200 rpm, more preferably about 70 rpm.

Since the raw cheese used in step A (step $A_1$) is low in sodium chloride it is important to add sodium chloride to the fibrous structure immediately before or preferably during the holding step C to obtain a processed cheese with a good taste. Adding the sodium chloride at an earlier stage of the process has an unfavourable effect on the fibrous structure of the processed cheese and hence reduces the stretchability. The impact of NaCl addition on cheese formation and in particular on the casein micelles, has already been described in F. Gaucheron, Y. Le Graet and V. Briand, Milchwissenschaft 55 (2) 2000, S. 82–86. It goes without saying that the amount of sodium chloride to be added is dependent on the sodium chloride content of the blend entering step C. In a preferred embodiment of the invention, 0.5 to 2.0 wt % of sodium chloride with respect to the fibrous structure, are added.

A particularly preferred embodiment of the method according to the present invention is as follows: young low-sodium-chloride cheese and hydrocolloids are blended to form a first blend (step $A_1$), which first blend is then blended with the emulsifying salts to form a second blend (step $A_2$). Subsequently, the second blend is heated to a temperature of about 65° C. or more to form a heated second blend (cooking step B). Then sodium chloride is added to the heated second blend at a temperature of about 65° C. or more to form a third blend. The third blend is then kneaded under low shear conditions at a temperature of about 65° C. or more for a time sufficient to form the processed mozzarella cheese having a fibrous structure (holding time) and finally packaged under low-shear conditions to maintain the fibrous structure.

For transporting cheese having a fibrous structure, such as the cheese as obtained after the cooking step and the processed cheese as obtained after the holding step, low shear pumps, such as mono pumps are favourably used. Medium shear pumps, such as gear pumps (type waukesha) that are usually used for the transport of processed cheese, should not be used. Using low shear pumps of the above kind ensures that the fibrous structure of the cheese is maintained to a maximum extent. Hence, the transportation of the processed mozzarella cheese as obtained in step C has to be performed under low-shear conditions as defined above.

The processed cheese of the mozzarella type as obtained in holding step C is preferably packaged in a subsequent step D. In view of the above it goes without saying that the packaging should be carried out under low shear conditions.

Preferably, the processed cheese as obtained in step C is packaged by subjecting it to chill-roll technology to afford non-wrapped slices of cheese or to a hot-filling method to give individually wrapped slices of cheese.

In the chill-roll method, the molten processed cheese is fed to a chilled roll where it solidifies. The thus-obtained ribbon of cheese is then cut into strips which are layered, separated and automatically packed. As will be appreciated, the non-wrapped slices of processed cheese as produced by the chill-roll method tend to stick together in the package containing 6, 8, 12, or more slices. Moreover, such processed cheese is more mould prone than processed cheese packed by the hot filling method.

In the hot filling method, the hot processed cheese is fed into a sealed pipe made from a polymer foil and is subsequently pressed into slices by pressing the polymer pipe filled with processed cheese by means of a system of rolls. The slices which are still connected by way of the polymer foil are cooled in ice water and afterwards, the slices are separated, so as to obtain individually wrapped slices. Finally, the individually wrapped slices are packed in polymer bags filled with inert gas. Individually wrapped cheese slices of this kind are prevented from sticking together and they are less mould prone than non-wrapped slices manufactured by the above chill-roll technology.

More details about the chill-roll and hot filling methods for processed cheese can be found in general textbooks well known to the persons skilled in the art, e.g. in Klostermeyer, H.; Berger, W.; Merkenich, K.; Uhlmann, G. (1989): Die Schmelzkäseherstellung, JOHA Leitfaden, pp. 138–140.

Machines useable for packaging the processed cheese according to the present invention are for example produced by Kustner Industries S. A.

Conventional processed mozzarella cheese cannot be subjected to the hot filling method since this technique requires a heating temperature of at least 70° C. At this temperature and even at significantly lower temperatures, conventional processed mozzarella cheese looses water which leads to an increase in viscosity and renders the cheese unsuited for the hot-filling technique. Due to the presence of hydrocolloids, the processed cheese according to the invention does not suffer from water loss upon heating, even at temperatures as high as 70° C. or more as typically employed in the hot filling technique.

The present invention is described in some more detail by the following example, which, however is not intended to limit the protective scope thereof.

EXAMPLE

A mixture consisting of 147.5 kg Cagliata cheese (54.5% dry-matter, 24.5% fat, 0.4% NaCl), 7 kg butter, 6 kg rennet casein (90 mesh), 200 g xanthan gum, 20 g Nisaplin (preservative), 200 g locust bean gum, 8 kg water and 200 g sorbic acid was prepared in a ribbon blender with two spiral stirrers. The blend was submitted to the cooker and mixed with 2.2 kg tri-sodium citrate (solved in 10 l water), and immediately after that the product was heated by direct steam injection to a temperature of 75° C., while stirring at a rotation speed of 70 rpm within 15 min (cooking step). The two spiral stirrers were rotated in opposite directions. Then, 2 kg NaCl dissolved in 5 l water was added. Subsequently, the blend was kneaded in the same cooker at 75° C. for 5 min to develop a fibrous structure (holding time). During this step the two spiral stirrers were rotated in the same direction. The rotation speed was 70 rpm. By means of a mono pump, the cheese mass was finally transported to a hot pack (hot filling) device to produce individually wrapped slices. The thus-obtained cheese had the appearance, taste, texture and stretchability of natural mozzarella.

What is claimed is:

1. A method for making processed cheese having a fibrous structure, said method comprising the steps of
    A) preparing a blend comprising young low-sodium-chloride cheese, hydrocolloids, and emulsifying salts, wherein the young low-sodium-chloride cheese has less than about 0.6 weight percent sodium chloride,
    B) cooking the blend as obtained in step A to create a fibrous structure, and
    C) holding the fibrous structure as obtained in step B at an elevated temperature to obtain the processed cheese having the fibrous structure,
    wherein sodium chloride is added immediately before or during step C and wherein the processed cheese may be hot packed while retaining the fibrous structure.

2. Method according to claim 1, wherein step A comprises the following steps:
    $A_1$) blending the young low-sodium-chloride cheese and the hydrocolloids to form a first blend,
    $A_2$) adding the emulsifying salts to the first blend and blending the mixture to form a second blend.

3. Method according to claim 1, wherein the cooking step B is carried out not later than 0.5 h after step A.

4. Method according to claim 2, wherein the cooking step B is carried out immediately after step A.

5. Method according to claim 2, wherein the emulsifying salts are used in the form of an aqueous solution.

6. Method according to claim 1, wherein the young low-sodium-chloride cheese is pasta filata type cheese.

7. Method according to claim 6, wherein the pasta filata type cheese is mozzarella or Cagliata cheese, or a mixture thereof.

8. Method according to claim 2, wherein the hydrocolloids are used in an amount of from 0.1 to 0.3 wt-% of the blend in step A and are selected from xanthan, locust bean gum, carragheen, guar gum or carboxymethylcellulose, or mixtures thereof.

9. Method according to claim 2, wherein the emulsifying salts are used in an amount of from 0.5 to 1.5 wt-% of the blend in step A and are selected from citrates or phosphates.

10. Method according to claim 1, further comprising the step of:
    D) packaging the processed cheese as obtained in step C.

11. Method according to claim 10, wherein the processed cheese is packaged in individually wrapped slices using a hot-filling method in step D.

12. Method according to claim 10, wherein the processed cheese is packaged in non-wrapped slices using a chill roll method in step D.

13. Method according to claim 9, wherein the processed cheese once it has a fibrous structure is handled under low shear conditions.

14. A method for making processed cheese having a fibrous structure, said method comprising the steps of
    (A) preparing a blend comprising young low-sodium-chloride cheese, hydrocolloids, and emulsifying salts, wherein the young low-sodium-chloride cheese has less than about 0.6 weight percent sodium chloride,
    (B) cooking the blend as obtained in step A to create a fibrous structure,
    (C) holding the fibrous structure as obtained in step B at an elevated temperature to obtain a fibrous cheese,
    (D) adding sodium chloride immediately before or during step C, and
    (E) hot packing the sodium chloride-containing fibrous cheese from steps C and D to obtain the processed cheese, wherein the hot packed processed cheese has the fibrous structure.

15. Method according to claim 14, wherein step A comprises the following steps:
    $A_1$) blending the young low-sodium-chloride cheese and the hydrocolloids to form a first blend,
    $A_2$) adding the emulsifying salts to the first blend and blending the mixture to form a second blend.

16. Method according to claim 14, wherein the cooking step B is carried out not later than 0.5 hours after step A.

17. Method according to claim 15, wherein the cooking step B is carried out immediately after step A.

* * * * *

UNITED STATES PATENT AND TRADEMARK OFFICE
CERTIFICATE OF CORRECTION

PATENT NO. : 6,933,000 B2
DATED : August 23, 2005
INVENTOR(S) : Kempter et al.

It is certified that error appears in the above-identified patent and that said Letters Patent is hereby corrected as shown below:

<u>Title page,</u>
Item [75], Inventors, insert third inventor's name -- Olaf Kortum, Neubiberg (DE) --.

Signed and Sealed this

Fourteenth Day of February, 2006

JON W. DUDAS
*Director of the United States Patent and Trademark Office*